US007136650B2

(12) United States Patent
Diaz Cervera et al.

(10) Patent No.: US 7,136,650 B2
(45) Date of Patent: Nov. 14, 2006

(54) METHOD FOR ROUTING MESSAGES BETWEEN A MOBILE CONTROL AND CELL CONTROL FUNCTIONAL ENTITIES OF A DISTRIBUTED RADIO ACCESS NETWORK

(75) Inventors: José Diaz Cervera, Stuttgart (DE); Rolf Sigle, Weinstadt (DE); Kristiaan Johan Venken, Schilde (BE); Ignacio Gomez Vinagre, Antwerp (BE)

(73) Assignee: Alcatel, Paris (FR)

( * ) Notice: Subject to any disclaimer, the term of this patent is extended or adjusted under 35 U.S.C. 154(b) by 421 days.

(21) Appl. No.: 10/785,226

(22) Filed: Feb. 25, 2004

(65) Prior Publication Data

US 2004/0180667 A1    Sep. 16, 2004

(30) Foreign Application Priority Data

Mar. 10, 2003   (EP)   .................. 03290580

(51) Int. Cl.
*H04Q 7/20* (2006.01)
*H04Q 7/00* (2006.01)

(52) U.S. Cl. .............. 455/445; 455/446; 455/453; 455/422.1; 370/328; 370/332; 370/335; 370/337; 370/342; 370/522

(58) Field of Classification Search ............ 455/445, 455/446, 453, 422.1; 370/332, 335, 337, 370/342
See application file for complete search history.

(56) References Cited

FOREIGN PATENT DOCUMENTS

| EP | 1 202 586 A1 | 5/2002 |
|---|---|---|
| EP | 1 372 349 A1 | 12/2003 |
| WO | WO 00/54521 A2 | 9/2000 |
| WO | WO 02/063912 A1 | 8/2002 |

OTHER PUBLICATIONS

"OpenRAN Architecture in 3rd Generation Mobile Systems; Technical Report MTR-007 Release v1.0.0" Technical Report MTR-007 Release v1.0.0, XX, XX, Sep. 4, 2001, pp. 1-64, XP002221482.
"Technical Specification Group Services and Systems Aspects; Architectural Requirements for Release 1999 (3G TS 23.121 version 3.0.0)" 3GPP Standard, 'Online! Jul. 31, 1999, XP002188892. Retrieved from the Internet: <URL:http://www.quintillion.co.jp/3GPP/Specs/23121-300.pdf>.

*Primary Examiner*—Joseph Feild
*Assistant Examiner*—Julio Perez
(74) *Attorney, Agent, or Firm*—Sughrue Mion, PLLC

(57) ABSTRACT

The invention relates to a method for routing a message from a Cell Control to a Mobile Control of a Radio Network Control equipment and vice versa. Such methods are substantially known in the art for Radio Network Controllers RNCs. The present invention proposes a communication between functional entities of a distributed RNC enabling the routing of the message by using known protocols and reusing identifiers already known for these protocols.

12 Claims, 4 Drawing Sheets

METHOD FOR ROUTING MESSAGES BETWEEN A MOBILE CONTROL AND CELL CONTROL FUNCTIONAL ENTITIES OF A DISTRIBUTED RADIO ACCESS NETWORK

The invention is based on a priority application EP 03 290 580.4 which is hereby incorporated by reference.

FIELD OF THE INVENTION

The invention relates to a method for routing messages previously sent by a terminal on the common control channel CCCH of a cell, from a Cell Control CC associated to said cell to a Mobile Control MC of a distributed Radio Network Controller RNC equipment of a Radio Access Network RAN to which the terminal is associated. Both, said Mobile Control and the Cell Control belonging to a distributed Radio Access Network RAN to which the terminal is associated.

The invention further relates to a method for routing a message from a Mobile Control functional entity to a Cell Control functional entity of a particular cell addressed within said message, wherein both, the Mobile Control and Cell Control represent functional entities within said distributed Radio Network Controller. Moreover, the invention relates to a distributed Radio Network Controller, a Radio Access Network, and to a computer program used by the said distributed Radio Network Controller.

BACKGROUND OF THE INVENTION

Such methods, controllers and networks are substantially known in the art; in particular they are known for universal mobile telecommunications systems UMTS-technology In the European patent application 1 202 586 A1 the basic concept of a UMTS-Radio Network is described. In a minimum configuration such a Radio Network comprises at least one terminal, at least one base station, at least one Radio Network Controller and finally at least one exchange. The Radio Network Controller RNC controls all cells in a rather large geographical area. For signaling between the terminals and the Radio Network Controller different protocols and in particular a Radio Resource Control Protocol has been defined. These protocols provide a standardized structure for the messages to be transferred in the way that these messages comprise a certain number of information fields for a predefined content. In the original UMTS Radio Access Network UTRAN architecture to identify a terminal, two parameters have been specified: the SRNC-ID, which identifies the serving RNC responsible for the user connection and the S-RNTI, which is an identifier for the user or terminal, generated by the serving RNC during the RRC establishment and unique within this serving RNC. In the same way, to identify a particular cell, two parameters have been specified: the CRNC-ID, which identifies the Controlling RNC, responsible for the control of a particular area, and the C-ID, which uniquely identifies a cell within the area controlled by the CRNC. Therefore, several messages whose internal structure has been standardized contain these fields which must be filled with the corresponding information.

However, in the meantime after the filing of the mentioned European patent application EP 1 202 586 A1, the architecture described therein has been evolved. In particular, the Radio Network Controller RNC has been split into several functional entities. Said evolved architecture is described in the not pre-published European patent application having the application number 02360168.5 and is illustrated in FIG. 4 of the present application. The functional entities shown there have different scopes for example a user scope i.e. there is one instance per connected user, a cell scope i.e. there is one instance per cell or a multi-cell scope i.e. there is one instance for a group of cells.

The functional entities relevant for the present description are the paging and broadcast P&B functional entity, a Cell Control CC functional entity and a Mobile Control MC functional entity. Hereinafter the term functional entity will typically be dropped for facilitating the following description.

The paging and broadcast P&B has a multi-cell scope. It is responsible, among other functions, to distribute paging messages used to locate a particular user in case of incoming calls and cell broadcast system messages used to send some kind of information, e.g. some short news service to all users in a cell onto which the messages should be sent.

The Cell Control has a cell scope. It is responsible for control functions related to a particular cell and it terminates the control channels associated with this cell such as a common control channel CCCH.

The Mobile Control has a user scope. It is dynamically instantiated that means created when a new signaling connection known as Radio Resource Control RRC connection is established for a particular user. It terminates the RRC connection and a Dedicated Control Channel DCCH for the user which is established by a RRC connection establishment.

As described later, a paging and broadcast functional entity is involved in the creation (instantiation) of a particular Mobile Control functional entity. From now on, this paging and broadcast functional entity will be referred to as the parent paging and broadcast PP&B of said Mobile Control.

As can be seen in FIG. 4, the Radio Access Network RAN and in particular the Radio Network Controller RNC is connected to a Core Network CN. For routing messages sent by a terminal/user UE on the CCCH of a particular cell between the Cell Control CC associated to the Base Station NB and the Mobile Control MC responsible for the user connection, the mentioned functional entities have to communicate with each other.

Starting from the prior art it is the object of the present invention to provide possible methods for routing a message from the Cell Control to a Mobile Control, and for routing a message from a Mobile Control to a Cell Control in such a manner that traditionally used protocols for routing such messages can be used without being changed. Further, it is the object of the invention to provide a distributed Radio Network Control RNC equipment and a Radio Access Network for carrying out said methods.

SUMMARY OF THE INVENTION

Said object is solved by a method for routing a Radio Resource Control message, previously sent by a terminal on the common control channel CCCH of a cell, from the Cell Control associated to said cell to a Mobile Control of a distributed Radio Network Controller equipment of a Radio Access Network to which the terminal is associated, the method comprising the steps of:
1a) Previously establishing a Radio Resource Control communication between the terminal and the Radio Access Network resulting in that the Mobile Control is instantiated and both said Mobile Control and terminal are configured with the identifier USER-ID, as well as the identifier PP&B-ID of a parent paging and broadcasting associated to the Mobile Control, these identifiers being used to uniquely identify a terminal in further Radio Resource Control RRC messages;

1b) Sending a Radio Resource Control RRC message from the terminal via a Common Control Channel of the cell where the terminal is located to a Cell Control associated to said cell within said distributed Radio Access Network;

1c) Forwarding the message from the Cell Control to the paging and broadcast associated to said Cell Control; and 1d) Forwarding the message from the paging and broadcast to the Mobile Control identified by the USER-ID in the case that the paging and broadcast associated to the cell corresponds to the parent paging and broadcast.

This object is further solved by a method for routing a message from a Mobile Control to a Cell Control of a particular cell addressed in said message, both the Mobile Control and the Cell Control representing functional entities within a distributed Radio Network Controller of a Radio Access Network.

4a) Previously establishing a Radio Resource Control connection resulting in that the Mobile Control is instantiated and is aware of a USER-ID identifying itself and its associated terminal, and a PP&B-ID and the transport address of its associated parent paging and broadcast, and the terminal is also made aware of both said USER-ID and PP&B-ID by sending them in the pre-existing fields S-RNTI and SRNC-id of the Radio Resource Control message sent by the network to complete the connection establishment;

4b) Sending a message containing the USER-id and the PP&B-id of the Mobile Control and its associated parent paging and broadcast, and further including the Cell-ID of the addressed cell and the P&B-ID of the paging and broadcast associated to said addressed cell from the Mobile Control to the parent paging and broadcast identified by its P&B-ID and transport address previously known by the Mobile Control;

4c) Forwarding the message from the parent paging and broadcast to the Cell Control addressed by the message in case this parent and broadcast corresponds to the parent paging and broadcast PP&B of the Mobile Control; and 4d) Sending the message to the addressed terminal directly on the common control channel CCCH of the associated cell.

Both methods provide the advantage that although the Radio Network Controller RNC does not exist as a single network element anymore but has been split up into the mentioned different smaller functional entities (potentially located in different network elements), the originally used terminals, that means the terminals used in the UTRAN architecture do not need to be changed because the Radio Resource Control protocol used for routing messages in said mentioned architecture can also remain unchanged in the evolved architecture. This is achieved by hiding the mentioned changes in the RNC from the terminals. More specifically, this hide is realized by using the same standardized fields within said known protocol but by applying a new meaning to these fields and filling them with appropriate values.

In particular, the field SRNC-ID which already exists in different control messages, will not be filled with an RNC-ID, since the RNC does not exist as a network element anymore.

Instead, said SRNC-ID field is filled with a PP&B-ID identifying a parent paging and broadcast functional entity responsible for instantiating a Mobile Control functional entity associated to a particular terminal. In the field S-RNTI also existing in the known protocol, the value coded will be the USER-ID which is generated by the parent paging and broadcast PP&B and sent to the Mobile Control entity when it is instantiated during a RRC-establishment.

In the same way, the value which will be coded in the field CRNC-ID, already existing in different control messages, will not be an RNC-ID but instead the P&B-ID of the paging and broadcast functional entity associated to a particular Cell Control functional entity. In the field C-ID, the value coded will be the Cell-ID corresponding to the Cell Control which is unique among all Cell Control entities having the same associated paging and broadcast functional entity.

Further advantageous embodiments of the methods are subject-matter of the dependent claims.

The object of the invention is further solved by a distributed Radio Network Control equipment, by a Radio Access Network and by a Core Network for carrying out the claimed methods, by a distributed server platform and by a least one computer program running on said server platform. The advantages of said solutions are identical to the advantages mentioned above by referring to the claimed methods.

BRIEF DESCRIPTION OF THE DRAWINGS

Attached to the description there are four figures, wherein.

DETAILED DESCRIPTION OF THE INVENTION

Figure 4:
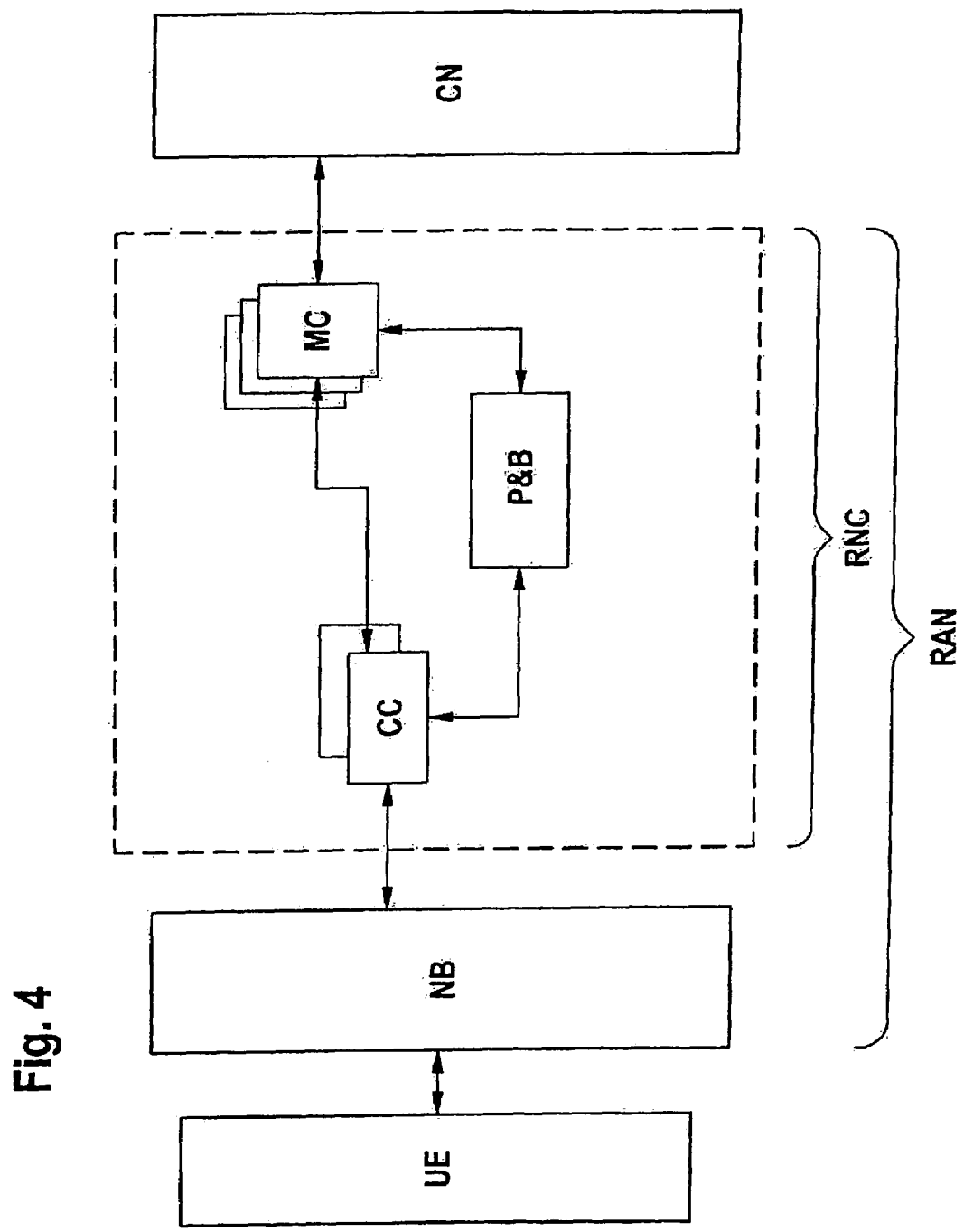
FIG. 4 shows a UMTS network as known in the art.

In the following the invention will be described in more detail by referring to the accompanying figures. However, because FIG. 4 has already been described above it is in the following only referred to by the reference numerals shown therein.

FIG. 1a shows a method according to the invention for routing a message, in particular a Radio Resource Control Message sent by a terminal UE from a Cell Control to a Mobile Control MC of a distributed Radio Access Network RNC of a Radio Access Network RAN to which the terminal is associated.

In detail the method comprises a previous step 1a) of establishing a Radio Resource Communication RRC between the terminal and the Radio Access Network RAN. Said establishing step results in that a Mobile Control MC is instantiated that means created and provided with a USER-ID identifying the terminal UE and the Mobile Control MC itself as well as a PP&B-ID for identifying the parent paging and broadcast PP&B functional entity associated to the Mobile Control MC and the transport address of said PP&B. Moreover, the USER-ID will be stored in the parent paging and broadcast PP&B together with the transport address associated to the newly instantiated Mobile Control MC. Finally, the PP&B-ID and the USER-ID will be sent to the terminal UE within the pre-existing fields SRNC-ID and S-RNTI, respectively. From this moment on, the terminal UE will always identify itself by including this information on the SRNC-ID and S-RNTI fields of the RRC messages it sends on the common control channel CCCH of any cell.

Said step for establishing the RRC communication will be described in more detail later by referring to FIG. 3. However, that step is necessary for the method described in FIGS. 1a and 1b as well as for the method described in FIGS. 2a and 2b for instantiating the Mobile Control MC and for providing required identifiers ID to the terminal or the Mobile Control.

After the communication has been established the method is carried out as shown in FIG. 1a. In particular, in a step 1b) the message is sent from the terminal UE via a Common Control Channel CCCH of the cell where the terminal UE is located to a Cell Control CC associated to said cell within said distributed Radio Network Controller RNC. The terminal identifies itself by using the fields SRNC-id and S-RNTI, where it includes the information previously provided by the network during the RRC establishment, i.e. the PP&B-id of the parent paging and broadcast of its associated Mobile Control, and the USER-id which identifies said Mobile Control (since it uniquely identifies one of the Mobile Control functional entities associated to this particular parent paging and broadcast). Afterwards, in step 1c) the Cell Control CC forwards the message received from the terminal UE to a paging and broadcast P&B functional entity associated to said Cell Control CC. If that paging and broadcast functional entity associated to the Cell Control is identical to the parent paging and broadcast functional entity identified in the message and associated to the Mobile Control MC, said paging and broadcast P&B forwards the message to said Mobile Control, identified by the USER-id (step 1d). The transport address of the Mobile Control is known because it is stored by the PP&B when the Mobile Control is instantiated (during the RRC connection establishment).

FIG. 1b illustrates the case that the paging and broadcast P&B functional entity associated to the cell control CC is not identical to a so-called parent paging and broadcast PP&B functional entity being associated to the Mobile Control MC. In that case step b) corresponds to step b) as described above by referring to FIG. 1a. According to step 1c-1) the message is forwarded by the cell control to the paging and broadcast P&B functional entity associated to said Cell Control. Afterwards said paging and broadcast functional entity sends the message to the parent paging and broadcast functional entity associated to the Mobile Control (step 1c-2)). This is possible because the message generated by the terminal UE comprises the SRNC-ID identifying said parent paging and broadcast functional entity. Finally, the message is again transmitted from the parent paging and broadcast to the Mobile Control MC (step 1d)).

In the case that the paging and broadcast associated to the cell does not correspond to the parent paging and broadcast, the paging and broadcast P&B associated to the Cell Control forwards the message to the parent paging and broadcast PP&B associated to the Mobile Control (identified by the PP&B-ID sent within the SRNC-ID field of the message), which in turn forwards the message to said Mobile Control using the USER-ID contained in the S-RNTI field of the message.

Figure 2:
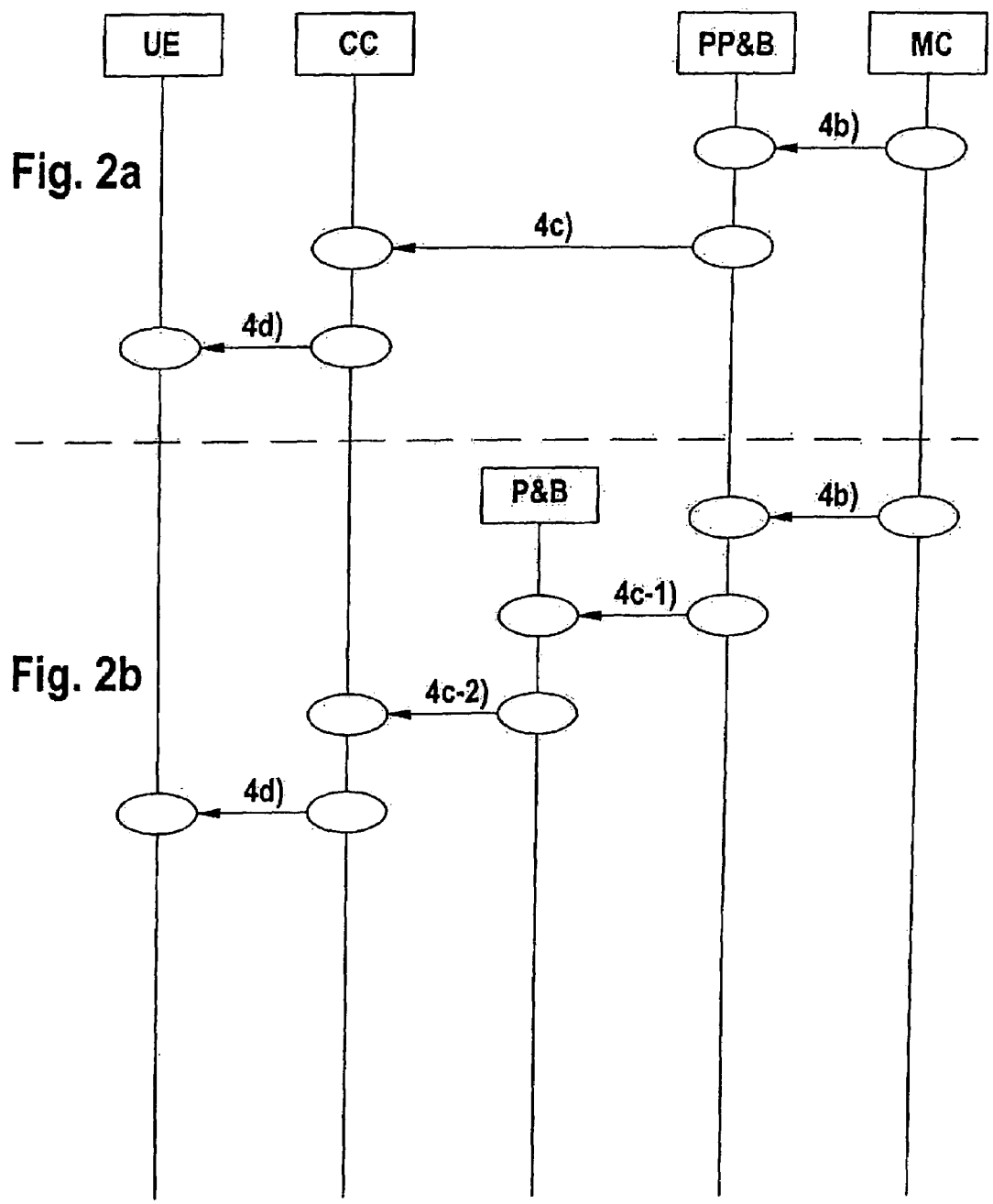
FIG. 2a illustrates a second method of the invention.
FIG. 2b illustrates another embodiment of said second method of the invention.

FIG. 2a illustrates the method for routing a message in the opposite direction, that means from the Mobile Control MC to the Cell Control or to the terminal UE. This method also requires the previous establishment of a Radio Resource Control RRC connection in order to instantiate the Mobile Control and to provide said Mobile Control and the associated terminal with the required identifiers, in particular the USER-ID as well as the PP&B-ID and a transport address both identifying the parent paging and broadcast PP&B associated to the Mobile Control (step 4a).

According to FIG. 2a the method comprises a step 4b) in which the message is sent from said Mobile Control MC to the parent paging and broadcast PP&B identified by its RNC-ID and its transport address known by the Mobile Control MC. The message to be routed does not only include the USER-ID of the Mobile Control and the PP&B-ID of the parent paging and broadcast functional entity but also the cell ID of the cell addressed by said message and the RNC-ID of the paging and broadcast P&B associated to said addressed cell. With the help of in particular the two latter-mentioned identifiers it is possible that the parent paging and broadcast forwards the message to its associated Cell Control in the case that said parent paging and broadcast PP&B is identical to the paging and broadcast P&B associated to said Cell Control step 4c).

In the opposite case the parent paging and broadcast PP&B forwards the message to the paging and broadcast associated to the destination Cell Control identified by the P&B-ID sent together with the message, which in turn forwards the message to said Cell Control using the Cell-ID.

Finally, the Cell Control CC transmits the message via the Common Control Channel CCH, which is received by all terminals located in the cell associated to the Cell Control. With the help of the PP&B-id and the USER-ID, which are sent within the fields SRNC-id and S-RNTI, respectively, the addressed terminal is able to recognize that the received message is addressed to it (step 4d)).

Figure 1:
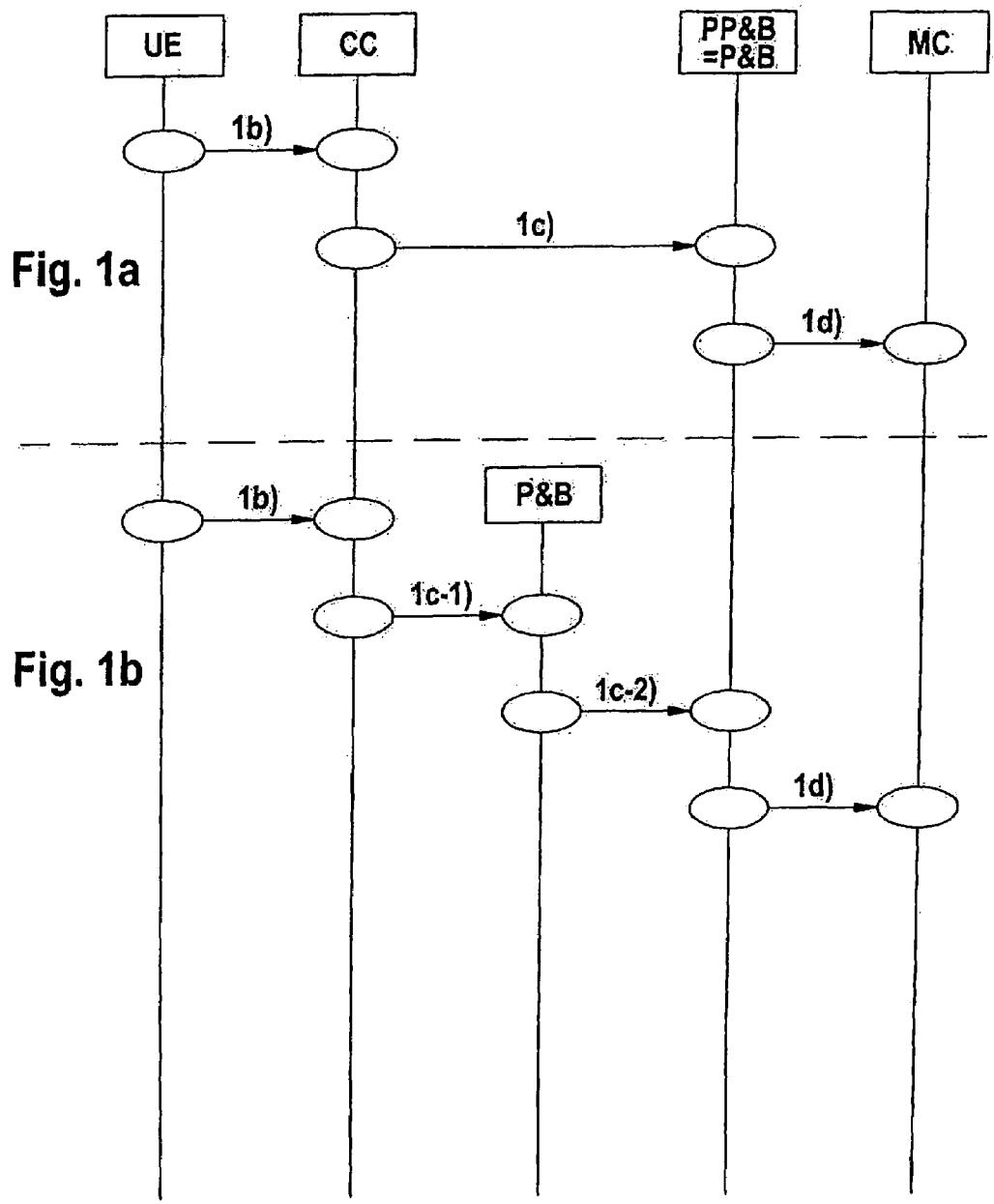
FIG. 1a illustrates first method according to the invention.
FIG. 1b illustrates another embodiment of the first method of the invention.

FIG. 2b illustrates a case similar to FIG. 1b, namely that the parent paging and broadcast PP&B associated to the Mobile Control MC is not identical to the parent and broadcast P&B associated to the Cell Control addressed within the message. As already described by FIG. 1 in that case the message is sent from the parent paging and broadcast via the paging and broadcast associated to the Cell Control of the addressed cell (step 4c-1), 4c-2)).

For routing between Mobile Control and Cell Control or vice versa, each paging and broadcast P&B must be initially configured with a list of all other paging and broadcast P&Bs, containing both their P&B-id and their associated transport address, as well as a list of its associated Cell Control functional entities CCs, containing both their Cell-ID and their associated transport address. Moreover, each Cell Control must also be initially configured with the P&B-id and the transport address of its associated paging and broadcast P&B.

Figure 3:
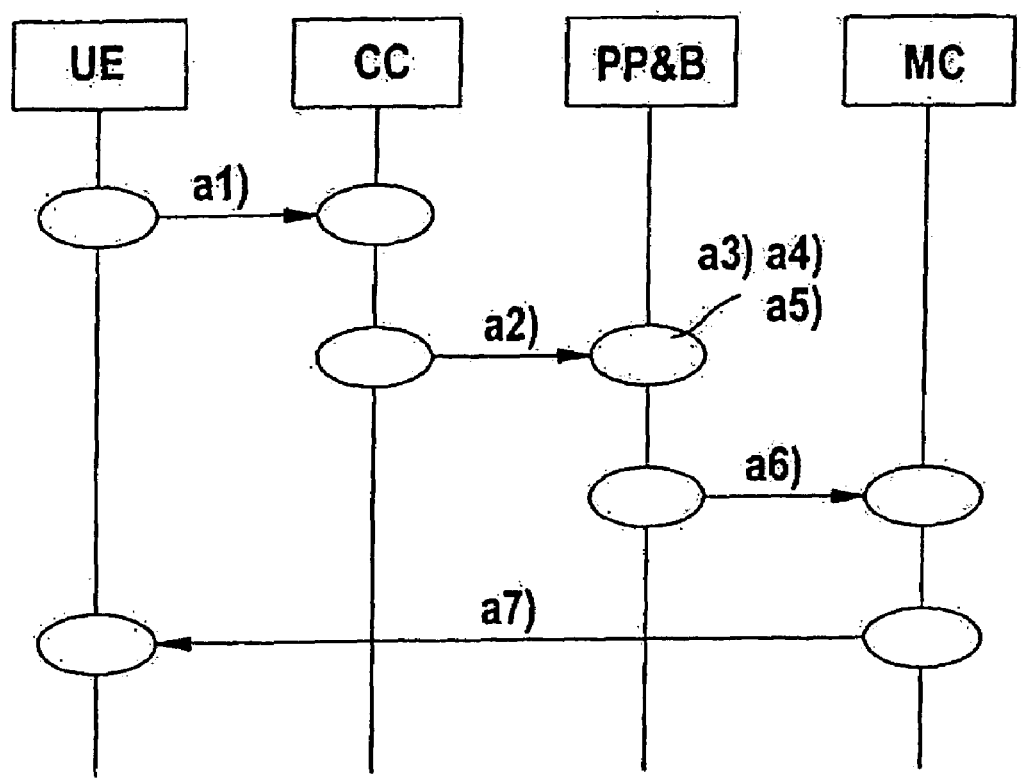
FIG. 3 illustrates a RRC connection establishment according to the invention.

FIG. 3 illustrates the establishing of the Radio Resource Control RRC connection already mentioned above. Said process serves for instantiating a Mobile Control in the case that a terminal desires to initiate the communication towards the Radio Access Network. Moreover, it serves for applying the required identifiers IDs to the Mobile Control MC and to the terminal UE.

In particular, in the process of establishing the communication an RRC-message is sent from the terminal UE via the Common Control Channel CCCH to the Cell Control CC of that cell where the terminal UE is located (step a1). Said Cell Control CC notifies in step a2) the paging and broadcast P&B associated to it about the received RRC-message. In response to said notification step a3) that paging and broadcast functional entity instantiates that means creates a new Mobile Control MC. In that way the paging and broadcast associated to the cell receiving the RRC-message becomes the parent paging and broadcast PP&B functional entity of the newly created Mobile Control.

Further, said parent paging and broadcast allocates a unique USER-ID to said newly created Mobile Control MC which identifies both, the terminal and said new Mobile Control (step a4). Subsequently, the parent paging and broadcast PP&B stores the USER-ID and the transport address of said Mobile Control (step a5) and transmits said USER-ID as well as its own PP&B-ID and its own transport address to said Mobile Control MC (step a6)).

In a final step a7) a confirmation message confirming the completion of the establishment is sent from the Mobile Control MC back to the terminal UE. Said confirmation message includes the USER-ID of the Mobile Control MC and the RNC-ID identifying the parent paging and broadcast functional entity of the Mobile Control in the pre-existing fields S-RNTI and SRNC-id, respectively. Both identifiers enable the terminal to identify itself when sending messages on the common control channel CCCH of a cell, and will be used to route messages in particular to the instantiated Mobile Control as described above by referring to FIGS. 1a and 1b.

The methods described above and the distributed Radio Network Control equipment and the Radio Access Network are preferably, embodied as distributed server platforms running dedicated software.

The invention claimed:

1. Method for routing a Radio Resource Control message (RRC), previously sent by a terminal on the common control channel CCCH of a cell, from a Cell Control (CC) being responsible for controlling functions related to the cell and for terminating control channels associated with said cell and said Cell Control being associated to said cell to a Mobile Control (MC) of a distributed Radio Network Controller equipment of a Radio Access Network to which the terminal is associated, wherein said mobile control is dynamically created when a new signaling connection known as radio resource control RRC connection is established for a particular user, the method comprising the steps of:
   1a) Previously establishing a Radio Resource Control communication between the terminal and the Radio Access Network resulting in that the Mobile Control is instantiated and both said Mobile Control and the terminal are configured with an identifier USER-ID, as well as an identifier PP&B-ID of a parent paging and broadcasting associated to the Mobile Control, these identifiers being used to uniquely identify the terminal in further Radio Resource Control RRC messages;
   1b) Sending the Radio Resource Control message from the terminal via a Common Control Channel of the cell where the terminal is located to the Cell Control associated to said cell within said Radio Access Network;
   1c) Forwarding the Radio Resource Control message from the Cell Control to a paging and broadcast associated to said Cell Control; and
   1d) Forwarding the Radio Resource Control message from the paging and broadcast associated to the cell control to the Mobile Control identified by the USER-ID in the case that the paging and broadcast associated to the cell control associated to the cell control corresponds to the parent paging and broadcast.

2. Method according to claim 1, characterized in that alternatively in step 1c) the message is forwarded from the paging and broadcast being associated to the cell control via the parent paging and broadcast identified by the SRNC-ID comprised within said Radio Resource Control message to the Mobile Control (MC) in the case that the paging and broadcast (P&B) associated to the cell control does not correspond to the parent paging and broadcast.

3. Method according to claim 1, characterized in that step 1a) comprises the following steps:
   a1) Sending the Radio Resource Control message from the terminal via the Common Control Channel (CCCH) to the Cell Control (CC) of the cell where the terminal is located;
   a2) Notifying the paging and broadcast (P&B) associated to the Cell Control (CC) about the received Radio Resource Control message;
   a3) Instantiating the Mobile Control (MC) by the paging and broadcast (P&B) associated to the cell control, which becomes the parent paging and broadcast (PP&B) associated to the Mobile Control;
   a4) Allocating the USER-ID identifying both the terminal and the Mobile Control (MC) by the parent paging and broadcast (PP&B);
   a5) Storing the USER-ID and a transport address of the Mobile Control (MC) by the parent paging and broadcast (PP&B);
   a6) Transmitting the USER-ID of the Mobile Control (MC) as well as the PP&B-ID and the transport address both of the parent paging and broadcast (PP&B) to the Mobile Control (MC); and
   a7) Sending a confirmation message comprising the USER-ID of the Mobile Control (MC) and the PP&B-ID within pre-existing fields S-RNTI and SRNC-ID from the instantiated Mobile Control (MC) to the terminal.

4. Method for routing a message from a Mobile Control being dynamically created when a new signaling connection known as radio Resource Control RRC Connection is established for a particular user, to a Cell Control of a cell addressed in said message wherein said Cell Control terminates controlled channels associated with said cell and wherein both the Mobile Control and the Cell Control representing functional entities within a distributed Radio Network Controller of a Radio Access Network, the method comprising steps of:
   4a) Previously establishing the Radio Resource Control connection resulting in that the Mobile Control is instantiated and is aware of a USER-ID identifying itself and an associated terminal, and a PP&B-ID and a transport address of an associated parent paging and broadcast, and the associated terminal is also made aware of both said USER-ID and PP&B-ID by sending them in pre-existing fields S-RNTI and SRNC-ID of the message sent by the Radio Access Network to complete the Radio Resource Control connection establishment;
   4b) Sending the message containing the USER-id and the PP&B-ID of the Mobile Control and the associated parent paging and broadcast, and further including a Cell-ID of the addressed cell and the PP&B-ID of the paging and broadcast associated to said addressed cell control from the Mobile Control to the parent paging and broadcast identified by its PP&B-ID and transport address previously known by the Mobile Control;
   4c) Forwarding the message from the parent paging and broadcast to the Cell Control addressed by the message; and
   4d) Sending the message to the associated terminal directly on the common control channel CCCH of the cell.

5. Method according to claim 4, characterized in that alternatively in step 4c) the message is forwarded from the parent paging and broadcast (PP&B) via the paging and broadcast (P&B) associated to the addressed Cell Control (CC) and identified by the corresponding P&B-ID to said Cell Control (CC) in the case that the parent paging and broadcast (PP&B) does not correspond to the paging and broadcast associated to the Cell Control addressed by the message.

6. Method according to one of claim 4, characterized in that in step 4d) the message is sent directly to all terminals within said cell and is addressed to a specific one of said terminals by filling the pre-existing fields SRNC-ID and S-RNTI included in the message with the PP&B-ID identifying the parent paging and broadcast and the USER-ID identifying both the Mobile Control and the associated terminal.

7. Method according to claim 4, characterized in that step 4a) comprises the following steps:
- a1) Sending the RRC-message from the associated terminal via the Common Control Channel (CCCH) to the Cell Control (CC) of the cell where the terminal is located;
- a2) Notifying the paging and broadcast (P&B) associated to the Cell Control (CC) about the received RRC-message;
- a3) Instantiating the Mobile Control (MC) by the paging and broadcast (P&B) associated to cell control, which becomes the parent paging and broadcast (PP&B) associated to the Mobile Control;
- a4) Allocating the USER-ID identifying both the associated terminal and the Mobile Control (MC) by the parent paging and broadcast (PP&B);
- a5) Storing the USER-ID and the transport address of Mobile Control (MC) by the parent paging and broadcast (PP&B);
- a6) Transmitting the USER-ID of the Mobile Control (MC) as well as the PP&B-ID and the transport address both of the parent paging and broadcast (PP&B) to the Mobile Control (MC); and
- a7) Sending a confirmation message comprising the USER-ID of the Mobile Control (MC) and the PP&B-ID within the pre-existing fields S-RNTI and SRNC-ID from the instantiated Mobile Control (MC) to the associated terminal.

8. A distributed Radio Network Control (RNC) equipment comprising a Mobile Control (MC), a paging and broadcast (P&B) and a Cell Control as functional entities, characterized in that these functional entities are embodied in different network elements and communicate with each other according to the method claimed in claim 1.

9. A Radio Access Network (RAN) characterized in that it comprises at least one distributed Radio Network Control (RNC) according to claim 8.

10. A core network (CN) characterized in that it comprises at least one Radio Access Network (RAN) according to claim 9.

11. A distributed server platform for an RNC or RAN running dedicated software including code means being adapted to carry out the method claimed by claim 1.

12. A computer readable medium storing a program for executing the method according to claim 1.

* * * * *